United States Patent [19]

Krimmer et al.

[11] Patent Number: 4,520,227
[45] Date of Patent: May 28, 1985

[54] STRAIN RELIEF CONNECTION BETWEEN A HOUSING AND AN ELECTRIC CONDUCTOR ASSEMBLY

[75] Inventors: Erwin Krimmer, Plüderhausen; Siegfried Fehrenbach, Markgröningen, both of Fed. Rep. of Germany

[73] Assignee: Robert Bosch GmbH, Stuttgart, Fed. Rep. of Germany

[21] Appl. No.: 411,052

[22] Filed: Aug. 24, 1982

[30] Foreign Application Priority Data

Mar. 6, 1982 [DE] Fed. Rep. of Germany ....... 3208108

[51] Int. Cl.³ .................. H02G 3/18; H02G 15/007; F16K 31/06
[52] U.S. Cl. .................. 174/65 R; 174/52 S; 174/135; 251/30; 251/139; 251/141
[58] Field of Search .............. 174/52 S, 65 R, 135; 339/102 R, 103 R, 103 M, 107, 218 R, 218 M, 218 C, 218 L; 310/71, 87, 88; 335/260, 278; 338/164; 417/422; 251/139, 141; 222/146 HA

[56] References Cited

U.S. PATENT DOCUMENTS 2,619,513 11/1952 Wolfenbarger .................. 174/52 S

FOREIGN PATENT DOCUMENTS 1801954  6/1970 Fed. Rep. of Germany ... 339/218 R
2607083  9/1977 Fed. Rep. of Germany .... 174/52 S
2842382  4/1980 Fed. Rep. of Germany ...... 251/141

Primary Examiner—Laramie E. Askin
Attorney, Agent, or Firm—Edwin E. Greigg

[57] ABSTRACT

A strain relief connection between a housing and an electric conductor assembly. The housing is formed of two plastic housing parts (2,20) which meet with each other over a contact surface (47). The electric conductor assembly (42) includes stranded conductors (43) extending through individual plastic jackets (45) which are surrounded by a common insulating sheath (46). The electric conductor assembly (42) passes from the exterior of the housing to the interior thereof, with portions of the plastic jackets (45) arranged over and contacting the contact surface (47) between the two housing parts (2,20) and with the two housing parts (2,20) being heat sealed together with the plastic jackets (45) at the contact surface (47). One (20) of the two housing parts has a collar-shaped attachment (48) inclined with respect to the contact surface (47) in the vicinity of the electric conductor assembly (42) and partially overlapping the sheath (46) and pressing the sheath (46) against the other (2) of the two housing parts. The strain relief connection is especially useful in conjunction with the housing and electric conductor assembly of an electromagnetic valve.

1 Claim, 1 Drawing Figure

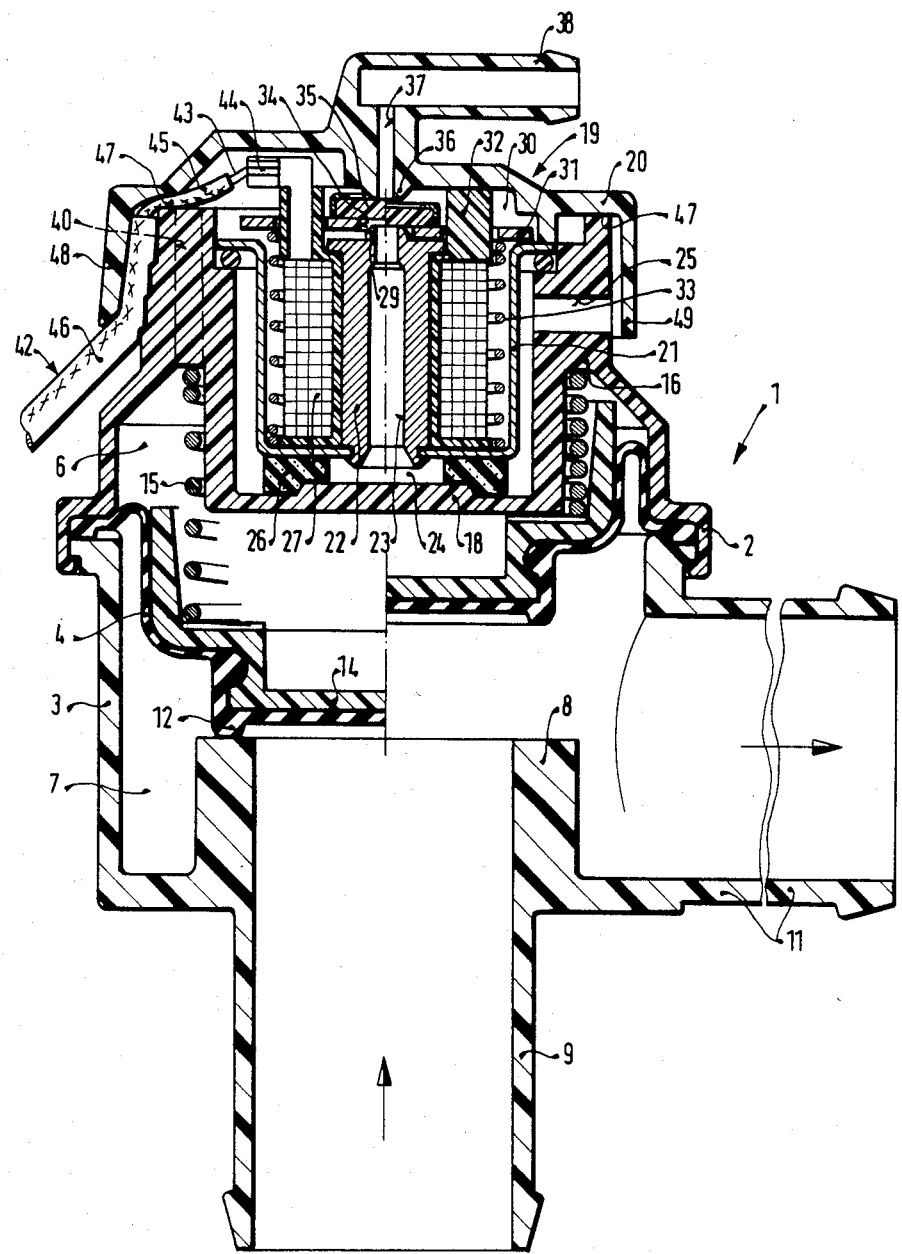

STRAIN RELIEF CONNECTION BETWEEN A HOUSING AND AN ELECTRIC CONDUCTOR ASSEMBLY

BACKGROUND OF THE INVENTION

The invention is based upon a strain relief connection of the kind described hereinafter. Connections for an electric conductor assembly have been proposed which are constructed either as plug type connections or as a cable which is relieved from tensile stress but yet is not pressure-sealed to the housing into which it extends.

OBJECT AND SUMMARY OF THE INVENTION

The strain relief connection according to the present invention features two plastic housing parts which are pressure-sealed to an electric conductor assembly and has the comparative advantage that it may easily be manufactured as pressure-sealed without the aid of supplementary sealing or extrusion.

Advantageous further developments and improvements of the strain relief connection according to the invention are possible by means of a unique collar-shaped attachment formed on one of the housing parts. Strain relief of the electric conductor assembly is thereby attained.

BRIEF DESCRIPTION OF THE DRAWING

A preferred embodiment of the invention is presented in sectional form in the single FIGURE of the drawing.

DESCRIPTION OF THE PREFERRED EMBODIMENT

A controlling apparatus 1 is by way of example constructed with an upper housing half 2 and a lower housing half 3. A movable wall in the form of an elastic control membrane 4 is fixed at its circumference between the overlapping portions of housing halves 2,3. The control membrane 4, which serves as a control element, separates a steering fluid space 6 from a counterspace 7 into which a control valve seat 8 protrudes. An inflow connecting piece 9, for example, discharges at the control valve seat 8. An outflow connecting piece 11 leads away from counterspace 7. The control membrane 4 is constructed as a movable valve component, and with its front face 12 it opens the control valve seat 8 either more or less so that a flow from inflow connecting piece 9 to outflow connecting piece 11 may ensue. On the left side of the drawing, the control membrane 4 is depicted in a position where it seals control valve seat 8 while the right side of control apparatus 1 shows control membrane 4 in a position in which it has been lifted from control valve seat 8. A spring plate 14 is provided for on the side of control membrane 4 which is turned away from control valve seat 8. The spring plate 14 lends a certain stiffness to the control membrane 4 in the area of front face 12 at which readjusting spring 15 supports itself, which on its other side lies against base 16 of upper housing half 2. An electromagnet valve 19 is disposed in a vaulted protrusion 18 of base 16 which partially protrudes into the steering fluid area 6. The valve is sealed to the outside by means of a lid or further housing part 20. The electromagnet valve also exhibits a cup-shaped valve chamber 21 which is made of magnetically conducting material in which a tubular core 22 is riveted. A through-hole 23 is provided for in the core which terminates in a flow channel 24 which is constructed between the protrusion 18 and the valve chamber 21 and which communicates with the atmospheric air via a bore 25. A ring-shaped filter 26 may also be arranged in the flow channel 24 between the protrusion 18 and the valve chamber 21. In the interior of valve chamber 21, core 22 is surrounded by a magnet coil 27. The core 22 protrudes out of the magnet coil 27 forming a first valve seat 29. Through-hole 23 of core 22 discharges via the first valve chamber 21 and lid 20. A plate-like flat armature 31 is positioned in space 30 across from core 22. The armature is guided in an axial direction of the valve via the pilot 32. A pressure spring 33 is provided for between magnet coil 27 and valve chamber 21, coaxially to magnet coil 27. The pressure spring 33 is supported by valve chamber 21 on the one side and by flat armature 31 on the other. Flat armature 31 exhibits an opening 34 in the region of the first valve seat 29. The ring-shaped first valve seat 29 protrudes into this opening 34, which is covered with a sealing element 35, for example a flat rubber piece, and which is joined with flat armature 31 at the side of the flat armature which is turned away from the first valve seat 29. A second valve seat 36 is provided for in lid 20. This second valve seat faces sealing element 35 of flat armature 31 into which a flow bore 37 of a second fluid connection 38 discharges. The space 30 communicates with the steering fluid space 6 via a flow channel 40 in base 16.

The electric connection for activation of the electromagnet valve is made, according to the invention, by means of a cable 42 whose stranded conductors 43 are squeezed into connecting terminals 44 of magnet coil 27 and which project into a space 30 between upper housing half 2 and lid 20. The stranded conductors 43 are embedded in plastic or thermoplastic, for example, individually separated by single plastic tubings 45 which are surrounded by a common cable sheathing 46 also made of plastic or a thermoplastic material. The upper housing half 2 and the lid 20 are made of a plastic too and contact each other at a contact surface 47 which is, for example, ring-shaped and in which the housing part 2 and lid 20 are welded together, pressure-sealed, for example, by ultrasonic welding. According to the invention, cable 42 should be led out of space 30 in such a manner that it proceeds via contact surface 47 between the housing part 2 and lid 20 so that at least the plastic tubings 45 of stranded conductors 43 are able to melt together during the welding process with the plastic in the space of both housing part 2 and lid 20 at contact surface 47. Thereby a pressure-sealed passage of the stranded conductors 43 from the atmosphere into space 30 is assured. With such a method, the cable sheathing 46 would become so far removed that the stranded conductors 43 surrounded only by plastic tubings 45 would lead to connecting terminal 44 via contact surface 47. The welding at contact surface 47 could, however, proceed in such a manner that the stranded conductors 43 would still be surrounded by cable sheathing 46 at contact surface 47 so that the cable sheathing 46 is included in the welding process. According to the invention, lid 20 is provided with a collar-shaped attachment 48 which is inclined with respect to contact surface 47 and led in the direction to upper housing half 2 which it partially overlaps, thereby pressing cable 42 against upper housing half 2. In this manner a desired strain relief of stranded conductors 43 is assured at connecting terminals 44. The activation of electromagnet valve 19 via cable 42 proceeds by means of an electronic control device, which is not shown.

The operating characteristics of the control apparatus 1 are as follows:

With an unactuated electromagnet valve 19, flat armature 31 is, by means of pressure spring 33, shifted in the direction towards the second valve seat 36 which the sealing element 35 closes. In this position, depicted by the lefthand side of the drawing, atmospheric air may flow to the first valve seat 29 and subsequently into space 30, flow channel 40, and steering fluid space 6 via bore 25 which is covered by a nose 49 of lid 20 in order to reduce the danger of pollution. The steering membrane 4, herewith and with the cooperation of readjusting spring 15, becomes pressed onto the control valve seat 8 so that no flow ensues via the steering flow line. An air pressure considerably below atmospheric pressure should prevail at the second fluid connection 38 and thereby at the second valve seat 36. With an actuated electromagnet valve 19, flat armature 31 is attracted to core 22 and the sealing element 35 shuts the first valve seat 29 and opens the second valve seat 36 so that air may exit out of the steering fluid area 6 via flow channel 40, space 30, second valve seat 36 and second fluid connection 38 and further that a drop in the pressure of the steering fluid space ensues, so that the acting forces at control membrane 4 may lead to a lifting of control membrane 4 from control valve seat 8, in order that a flow may proceed from inflow connecting piece 9 to outflow connecting piece 11 via control valve seat 8. With an actuated electromagnet valve 19, flat armature 31 and sealing element 35 assume a position such as the one depicted in the right hand side of the drawing.

The foregoing relates to a preferred embodiment of the invention, it being understood that other embodiments and variants thereof are possible within the spirit and scope of the invention, the latter being defined by the appended claims.

What is claimed and desired to be secured by Letters Patent of the United States is:

1. A strain relief connection formed between a housing and an electric conductor assembly passing from the exterior of the housing to the interior thereof, comprising: a housing having two plastic housing parts, said housing parts meeting each other over a contact surface; an electric conductor assembly including stranded conductors extending through individual plastic jackets and a common insulating sheath surrounding said plastic jackets; said electric conductor assembly passing from the exterior of said housing to the interior thereof and having portions of said plastic jackets arranged over and contacting said contact surface between said housing parts; said housing parts being heat sealed together with said plastic jackets at said contact surface; and one of said housing parts having a collar-shaped attachment inclined with respect to said contact surface in the vicinity of said electric conductor assembly and partially overlapping said sheath and pressing said sheath against the other housing part.

* * * * *